United States Patent

Bair

Patent Number: 5,391,415
Date of Patent: Feb. 21, 1995

[54] ARTICLE FOR ABSORBING OILS

[75] Inventor: Thomas I. Bair, Wilmington, Del.

[73] Assignee: E. I. Du Pont de Nemours and Company, Wilmington, Del.

[21] Appl. No.: 129,563

[22] Filed: Sep. 30, 1993

[51] Int. Cl.⁶ .............................................. B32B 1/06
[52] U.S. Cl. .................................... 428/74; 428/76;
428/102; 428/195; 428/219; 428/220; 210/924;
210/502.1
[58] Field of Search ................... 428/74, 76, 102, 195,
428/219, 220; 210/924, 502.1

[56] References Cited

U.S. PATENT DOCUMENTS

| | | | |
|---|---|---|---|
| 4,618,531 | 11/1986 | Marcus | 428/284 |
| 4,737,394 | 4/1988 | Zafiroglu | 428/102 |
| 4,957,794 | 9/1990 | Bair | 428/74 |
| 4,965,129 | 10/1990 | Bair et al. | 428/398 |

Primary Examiner—Alexander S. Thomas

[57] ABSTRACT

An oil-absorbing article has longitudinal channels that surround a layer of polyester or polyolefin fiber balls with a porous outer fabric. The channels are 1 to 4 cm wide and 0.8 to 1.4 cm thick. The article absorbs oil amounting to at least six times its dry weight and can be re-used at least five times.

4 Claims, 1 Drawing Sheet

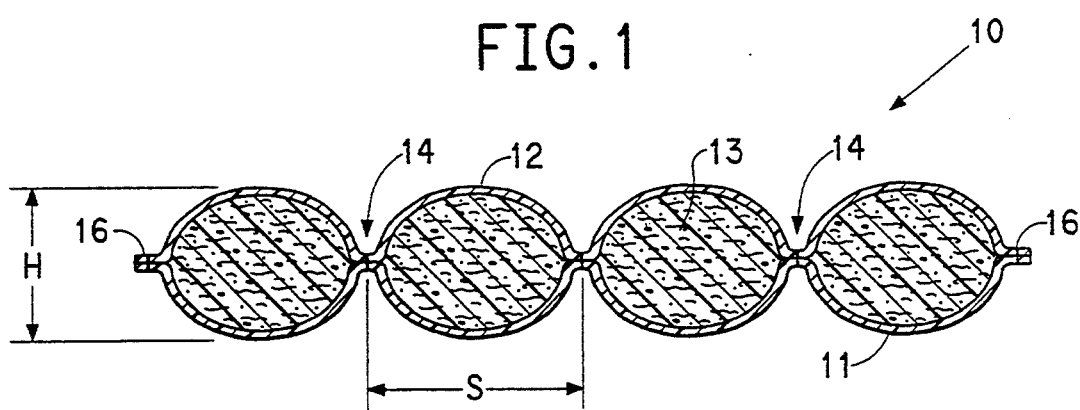
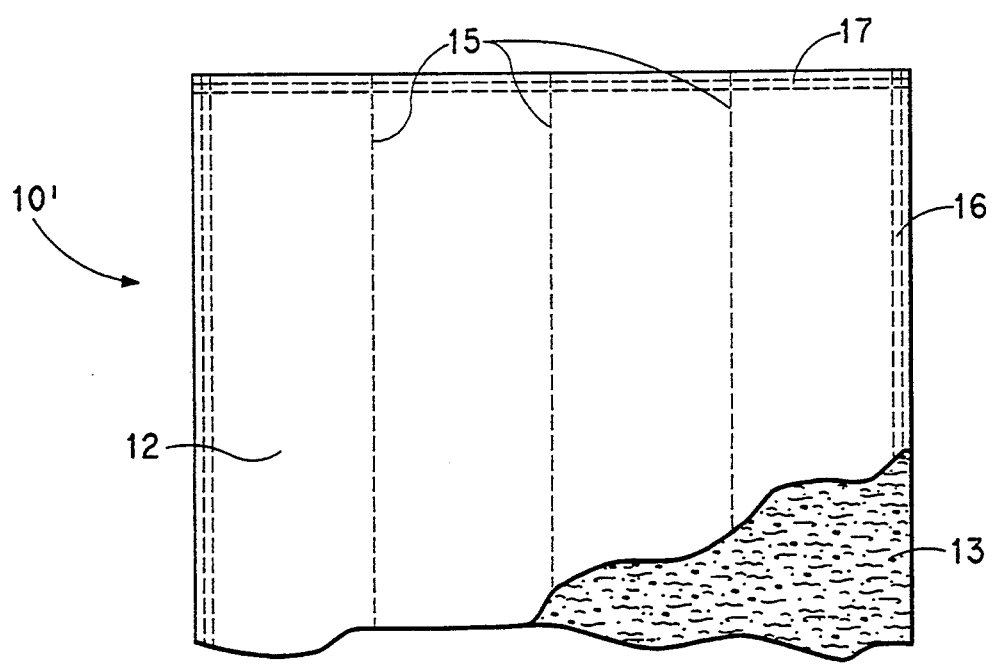

ARTICLE FOR ABSORBING OILS

BACKGROUND OF THE INVENTION

1. Field of the Invention

This invention relates to an oil-absorbing article that has a porous outer fabric which surrounds a fibrous absorbent material. More particularly, the invention concerns such an article that has a specific polyester fluff filling material, thickness and geometric construction which provide the article with a high capacity for absorbing oil and an ability to be re-used at least five times.

2. Description of the Prior Art

Articles for absorbing spilled oil and preventing the oil from spreading on floors or other surfaces are known. For example, such oil absorbers have been used at the bases of lathes, milling machines, cutters and the like. A conformable oil-absorbing article of generally cylindrical shape having a porous, outer fabric and a filling of fibrous particles of flash-spun polyethylene, optionally containing additional particles made of foamed organic polymer, is disclosed by Bair et al, U.S. Pat. No. 4,965,129. Zafiroglu, U.S. Pat. No. 4,737,394, discloses a similar device having a porous outer fabric made from a nonwoven fibrous polyolefin layer that was stitchbonded with an elastic thread. In other such oil-absorbing articles, the oil-absorbent fibrous particles are of melt-blown polypropylene or of ground corn cobs and chaff. Generally, the density of the fibrous particles in the oil-absorbing article is in the range of 0.03 to 0.10 g/cm$^3$.

Although the above-described absorbers do absorb oil quite well, they are limited nonetheless in their utility. Typically, the known absorbers are suited for only one-time use. For example, squeezing such oil-soaked absorbers between coacting rolls to remove the absorbed oil, often can cause the filling material of the absorber to form clumps and/or become permanently compressed. Then, attempts to use the absorber a second time results in much less oil being absorbed than was absorbed in the first use of the article. Accordingly, an object of this invention is to provide an improved oil-absorbing article that will absorb large quantities of oil and permit several re-uses of the absorber.

SUMMARY OF THE INVENTION

The present invention provides an oil-absorbing article that has a porous outer fabric which surrounds an absorbent filling material of fibrous organic polymer. The fibrous filling material weighs in the range of 400 to 800 g/m$^2$ has a density in the range of 0.05 to 0.09 grams/cm$^3$ and consists essentially of fibrous balls of fluff formed from out-of-plane crimped fibers of 0.5 to 5 dtex, the fibers preferably being of polyester or polyolefin polymer. The porous outer fabric, preferably in the form of a spunbonded or spunlace fabric, weighs in the range of 100 to 170 g/m$^2$ is of polyester or polyolefin fibers, and forms an upper surface and a lower surface of the oil-absorbing article. The oil-absorbing article has a generally planar shape, a pattern of compressed narrow longitudinal lanes wherein the upper and lower surfaces are connected to each other, preferably by rows of stitches, the lanes being no more than 0.4-cm wide and forming channels between successive lanes. The channels have a width in the range of 1 to 4 cm, preferably 1.2 to 3 cm, and a thickness in the range of 0.8 to 1.4 cm, preferably 1 to 1.3 cm. The oil-absorbing article is capable of absorbing at least 8.3 kilograms of oil per square meter of article planar cross-section. The absorbed oil amounts to at least six times the original dry weight of the article. At least 70% of the absorbed oil can be removed from the absorber and the absorber can be reused at least five times, preferably at least ten times.

BRIEF DESCRIPTION OF THE DRAWINGS

The invention will be better understood by referring to the attached drawings wherein:

FIG. 1 is a vertical cross-section of a typical oil absorber 10 of the invention, in which longitudinal lanes 14 are formed by heat or adhesive seals between lower porous outer fabric 11 and upper porous outer fabric 12 and channels of absorbent filler material 13 are formed between successive lanes across the absorber, the channels having a width "S" and a thickness "H"; and FIG. 2 is a partial plan view of an oil-absorber 10' in which absorbent filler material 13 is interposed between lower porous outer fabric 11 (hidden in this view) and an upper porous outer fabric 12 (partially cut away), and the longitudinal lanes are formed by rows of stitches 15 (indicated as dashed lines) connecting the lower and upper outer fabrics 11 12, and longitudinal edge lane 16 and transverse end closures 17 are formed by double rows of stitches.

DETAILED DESCRIPTION OF PREFERRED EMBODIMENTS

The invention is further illustrated by the following description of preferred embodiments, with further reference to the drawings.

In accordance with the present invention, the oil-absorbing article of the invention is generally planar in shape and comprises a porous outer fibrous layer which forms a porous upper surface 12 and a porous lower surface 11, which surfaces surround an absorbent fibrous filling material 13.

Typically, the upper and lower surfaces are attached to each other, preferably by rows of stitches located in relatively narrow longitudinal lanes 14. The lanes are no more than 0.4-cm wide, preferably less than 0.3-cm wide and are much thinner than the remainder of the absorber. Somewhat wider lanes are preferred at the longitudinal edges 16 of the oil-absorbing article. At the transverse ends 17 of the absorber, the upper and lower outer surface are connected to each other in substantially the same way as the longitudinal edges are connected. Preferably, double rows or triple rows of stitches are employed at the edges and end closures. Other convenient known types of closure can be used at the ends and edges of the oil-absorbing articles of the invention, such as sewn seams, heat seals, glued seals, or the like. Sewn seams are preferred. Such seams, seals and the like also are suitable for connecting the upper and lower outer surface layers to form the longitudinal lanes. Regions between successive longitudinal lanes are referred to herein as "channels" which have a width "S" and a height "H" as depicted in FIG. 1.

Suitable porous outer layers can be knitted, woven or nonwoven fabrics. Among the porous nonwoven fabrics that are suitable for use in the oil-absorbing articles of the present invention are spunlaced fabrics prepared by hydraulic entanglement techniques, mildly bonded spunbonded fabrics, stitchbonded fabrics or the like. The fabric must be sufficiently porous to permit oil to readily seep through the fabric to reach the absorbent material within the article. Various fibers are suitable for the outer porous fabric, particularly fibers of synthetic organic polymer (e.g., polyester, polyethylene, polypropylene). Preferably, the fabric comprises polyester fibers. Typically, porous fabrics weighing in the range of 100 to 170 g/m² are satisfactory. Lighter weight fabrics are preferred, particularly those weighing no more than 140 g/m².

According to the invention, fibrous filling material 13 of oil-absorbing article 10 is in the form of fluff balls made from out-of-plane crimped thermoplastic fibers of 0.5 to 5 dtex. Typically, the absorbent filling material between the porous outer surfaces of the absorber weighs in the range of 400 to 800 g/m² and has a density in the range of 0.05 to 0.09 g/cm³.

To prepare the absorbent fibrous balls of fluff that are the filling material of the oil-absorbing article, staple fibers of thermoplastic polymer are subjected to turbulent-air grinding. Jackering, U.S. Pat. No. 4,747,550, provides a detailed disclosure of equipment suitable for such grinding. A known commercial mill of this type contains a plurality of milling blades mounted on a rotor in a surrounding single cylindrical stator. The walls of each milling section are ridged. The mill has a gravity feed port leading to the bottom section of the rotor. Three air vents are equally spaced around the bottom of the cylinder surface. An outlet is located at the top of the surrounding stator. The gap between the ridges and the flat surfaces of the blades is usually about 0.1 to 1 millimeter. When the staple fibers are passed through the grinding mill, the fibers become crimped and many become entangled into a small balls of about 1 to 2 mm diameter. The individual fibers are crimped at random angles around the fiber axis. Multiple passes through the machine increase the formation of the small balls and increase their density. The thusly produced crimped fiber fluff is placed inside the porous outer layer. Staple fibers of thermoplastic polymers provide suitable fibers for convenient formation of the crimped fiber fluff. Among suitable polymers are polyesters, polyolefins (particularly polypropylene and polyethylene) and the like. Polyester fibers are preferred. Generally, the fibers have a decitex in the range of 0.5 to 5, preferably 1 to 3 dtex, and a staple fiber length (straightened) in the range of 0.5 to 2.5 cm.

Oil-absorbing article 10 of the invention can be produced conveniently by the following steps:

(a) place a lower porous fibrous layer 11 on a flat surface, e.g., a moving belt;
(b) deposit a layer of absorbent filling material 13 atop porous fibrous layer 11;
(c) position upper porous fibrous layer 12 atop filling material 13;
(d) form, by sealing means or stitches 15, longitudinal lanes 14 and double-width or triple-width lanes that are to become longitudinal edge lanes 16 and transverse end lanes 17; and
(e) cut the thusly assembled materials at the longitudinal edge lanes and transverse edge lanes to form the oil-absorbing article of desired dimensions.

Oil-absorbing articles in accordance with the invention have a high oil absorption capacity. The absorbed oil is at least 6 times the original dry weight of the absorber and amounts to at least 8.3 kilograms of oil per square meter of absorber planar cross-section. In addition, the absorber according to the invention permits a large percentage of the oil absorbed to be squeezed from the absorber and allows the absorbing article to be re-used satisfactorily at least five times and often more than ten times.

Test Procedures

In the preceding discussion and in the Examples below several parameters are reported. These parameters are measured as follows.

The maximum thickness H of the channels of the oil-absorbing article is measured with a caliper that just makes contact with the article surface. The width S of the channels is measured with a ruler from centerline to centerline of successive longitudinal lanes 14.

Density of the absorbent fluff material in the oil-absorbing article is determined from measurements of the dimensions of the article and the weights per unit area of the porous outer fabrics and the absorbent fluff material.

The ability of the oil-absorbing article to absorb oil is measured by placing a sample article of known weight for 60 minutes into a deep pan containing a ¼-inch (0.64-cm) depth of A-520 hydraulic oil (sold by Norton Petroleum Co. of Newark, Del.) and then removing the sample from the pan, allowing the sample to drain on a 10-mesh screen for two minutes and then re-weighing the sample. The amount of oil absorbed by the sample is determined from the difference between the sample weight before and after the exposure to the oil.

To determine re-useability of the oil-absorbing sample, several repetitions are performed of the preceding oil-absorption test. After each absorption test, the absorbed oil is squeezed from the sample by passing the sample through the nip formed by two, grooved plastic rolls, each of 2-inch (5.1-cm) diameter. The rolls are loaded at the ends of their axes by manually adjustable springs. The gap or clearance between the rolls, before introducing the oil-filled absorbent sample, is zero. The load is adjusted to assure removal of at least 70% of the absorbed oil. The absorber is then examined to determine whether unacceptable clumping of the filler material had occurred. When excessive clumping occurs, the absorber sample becomes inadequate for reuse. The weight of the sample is measured before and after each cycle of oil absorption and squeezing. The measured weights are used to calculate (1) "Fw", absorption per unit weight, which is the weight of absorbed oil in a sample divided by the total weight of the original dry sample before its first absorption use; (2) "Fa" absorption per square meter which is the weight (g) of absorbed oil in a sample divided the area (m2) of the sample; and (3) "% R", the weight of oil squeezed from a sample after use, expressed as a percent of the total weight of oil absorbed in the sample. The test is repeated at least ten times or until unacceptable clumping of the absorbent fibrous filling material is apparent.

EXAMPLES

The invention is further illustrated by the following examples of preferred embodiments. The examples are included for purposes of illustration only and are not, intended to limit the scope of the invention, which is defined by the appended claims. In the examples, samples designated with Arabic numerals are of the invention; those designated with upper case letters are comparison samples.

In each example, fluff balls of crimped polyester fibers were used as the absorbent filling material (except in the comparative commercial samples). The fluff was prepared from commercially available polyester staple fibers of 0.5-inch (1.27-cm) length and 3 denier (3.3 dtex) (sold by Mini Fibers, Inc. of Johnson City Tenn.). The fibers were fed through a multi-station rotor mill (Model III Ultra-Rotor, sold by Jackering GmbH of West Germany) which operated at 1,200 rpm with a clearance of 0.5 to 1 millimeter. The staple polyester fibers became crimped (about 1 crimp per cm) and a portion of the fibers became entangled into a small fluffy balls of about 1 to 3 mm in diameter having a density of was 0.058 to 0.66 g/cm$^3$, as measured under a load of 0.37 lb/in$^2$ (26 g/cm$^2$) in accordance with the method disclosed in Bair, U.S. Pat. No. 4,957,794, column 5, lines 3–26. The thusly produced fluff balls were supplied to a Rando-Feeder unit which formed the fluff into a batt of about 14 oz/yd$^2$ (475 g/m$^2$). The batt was placed between two layers of a 4.2 oz/yd$^2$ (142 g/m$^2$), porous, spunbonded polyester fabric (Type 1114 sold by Hoechst Celanese). The assembled layers were then stitched together in a longitudinal direction to form an oil-absorbing article having multiple longitudinal channels. In the Examples, the oil-absorbing capacity and the ability to re-use oil-absorbing articles in accordance with the invention are compared with those of articles outside the invention.

EXAMPLE 1

This example demonstrates the advantages in oil-absorbing capacity of oil-absorbing articles of the invention (Samples 1 and 2) over known commercial oil absorbers (Samples A and B). Comparative Sample A, a style RC-10790 "Powersorb" melt-blown polypropylene pad (sold by Minnesota Mining and Manufacturing Co.), which measured 5.25 inches (13.3-cm) in width, 6.25 inches (15.9 cm) in length and 0.451 inch (1.14 cm) in thickness, weighed 11 grams. Comparative Sample B, a point-bonded pad of polyester fibers, (Type RE-UZ-IT101 sold by New Pig Corp. of Tipton, Pa.), which measured 5 inches (12.7 cm) in width, 47.3 inches (120 cm) in length and 0.480 inch (1.22 cm) in thickness weighed 123 grams.

The dimensions of the channels, the weights of the oil-absorbing samples and the performance of the samples in oil-absorbency tests are summarized in Table I below. Each sample of the invention was 10 inches (25.4 cm) in length.

TABLE I

| | (Example 1) | | | |
|---|---|---|---|---|
| Sample | 1 | 2 | A | B |
| Sample weight, grams | 35 | 35 | 11 | 123 |
| Channels | | | | |
| Number | 8 | 4 | 1 | 1 |
| H, thickness, cm | 1.10 | 1.00 | 1.14 | 1.22 |
| S, width, cm | 1.3 | 2.5 | 13.3 | 12.7 |
| Absorption Tests | | | | |
| Grams of oil absorbed in first absorption | 250 | 308 | 173 | 1073 |
| Fw, g oil/g sample | 7.1 | 8.8 | 15.7 | 8.7 |
| Fa, Kg oil/m$^2$ sample | 8.7 | 10.5 | 7.9 | 7.0 |
| % R, % oil sqeezed out | 70 | 76 | 79 | 70 |
| Cycles to failure | >10 | >10 | 3 | — |

Notice that in comparison to Samples 1 and 2 of the invention, commercial Sample A not only failed after only 3 re-uses but it also had inferior oil absorption per unit area compared to Samples 1 and 2 of the invention and sample B was so inferior in oil absorption per unit area that it was not tested for re-use.

Example 2

This examples illustrates the effects of channel width S on the ability of the absorbers to be reused.

Four samples (a, b, c, and d) were prepared with channels of differing channel width as follows. The same general procedure for preparing the Sample 1 of Example 1, was used to prepare Sample a, except that the fluff batt was formed at a area weight of 20 oz/yd$^2$ (670 g/m$^2$) and the finished absorbent article sample had four channels of 1.1-inch (2.8-cm) width and 0.475-inch (1.21-cm) thickness. Sample b was prepared from Sample a by removing one longitudinal row of stitches from Sample a to form a multi-channel pad having two channels of 1.1-inch (2.8-cm) width and one channel of 2.2-inch (5.9-cm) width. All three channels of Sample b were 0.453-inch (1.15-cm) thick. Sample c was prepared from Sample a by removing two longitudinal rows of stitches to form a pad having one 1.1-inch (2.8 cm) wide channel of 0.451-inch (1.15-cm) thickness and one 3.5-inch (8.9-cm) wide channel of 0.410-inch (1.04-cm) thickness. Sample d was prepared from Sample B by inserting an additional longitudinal row of stitches to form a multi-channel pad having two 1.1-inch (2.8-cm) wide channels of 0.425-inch (1.08-cm) thickness, one 0.5-inch (1.3-cm) wide channel of 0.375-inch (0.95-cm) thickness, and one 1.9-inch (4.8-cm) wide channel of 0.455-inch (1.16-cm) thickness. All four samples were cut to 15 inches and the open ends sewed shut. Thus, the four samples included a total of five different channel widths.

Each sample was subjected to repeated oil-absorption and squeezing tests and then visually examined for movement and clumping of the filler within the individual channels. Table II summarizes the results of the tests.

TABLE II

| | (Example 2) | |
|---|---|---|
| Channel Width S, cm | Channel located in Samples | Number of cycles to failure by clumping |
| 1.3 | d | >10 |
| 2.8 | a, b, c, d | >10 |
| 4.8 | d | 4 |
| 5.6 | b | 3 |
| 8.9 | c | 2 |

The results of this example established the need for the oil-absorbing pads of the invention to have a width S in the range of 1 to 4 cm and preferably no wider than 3 cm.

I claim:

1. An oil-absorbing article having a porous outer fabric surrounding an absorbent filling material of fibrous organic polymer, wherein the filling material weighs in the range of 400 to 800 g/m$^2$ has a density in the range of 0.05 to 0.09 g/cm$^3$ and consists essentially of balls of fluff formed from out-of-plane crimped fibers of 0.5 to 5 dtex, the porous outer fabric weighs in the range of 100 to 170 g/m$^2$, is of polyester or polypropylene fibers and forms an upper surface and a lower surface of the oil-absorbing article, the oil-absorbing article has a generally planar shape, a pattern of compressed narrow longitudinal lanes wherein the upper and lower surfaces are connected to each other, the lanes being no more than 0.4-cm wide and forming channels between successive lanes, the channels having a width in the range of 1 to 4 cm and a maximum thickness in the range of 0.8 to 1.4 cm and the oil-absorbing article is capable of absorbing at least 8.3 kilograms of oil per square meter of article planar cross-section, the absorbed oil amounting to at least six times the original weight of the oil-absorbing article, and of being re-used at least five times.

2. An oil-absorbing article according to claim 1 wherein the upper and lower porous outer fabrics are polyester spunlace or spunbonded fabrics and the balls of fluff are of polyester or polypropylene polymer.

3. An oil-absorbing article according to claim 2 wherein the oil-absorbing article has longitudinal edges and transverse ends, each longitudinal lane is formed by a single row of stitches and each edge and each end closure is formed by two or more rows of stitches.

4. An oil-absorbing article according to claim 2 capable of being re-used at least 10 times and wherein the channels are 1.2 to 3 cm wide and 1 to 1.3 cm thick.

* * * * *